(12) United States Patent
Vucic

(10) Patent No.: US 10,363,520 B2
(45) Date of Patent: Jul. 30, 2019

(54) DRYING CARTRIDGE FOR OUTDOOR ELECTRICAL COMPONENTS

(71) Applicant: Tesla, Inc., Palo Alto, CA (US)

(72) Inventor: Jonathan Vucic, Poyntelle, PA (US)

(73) Assignee: Tesla, Inc., Palo Alto, CA (US)

( * ) Notice: Subject to any disclaimer, the term of this patent is extended or adjusted under 35 U.S.C. 154(b) by 156 days.

(21) Appl. No.: 15/678,079

(22) Filed: Aug. 15, 2017

(65) Prior Publication Data

US 2019/0054417 A1 Feb. 21, 2019

(51) Int. Cl.
*B01D 53/02* (2006.01)
*B01D 53/26* (2006.01)
*B01D 53/04* (2006.01)

(52) U.S. Cl.
CPC ....... *B01D 53/261* (2013.01); *B01D 53/0415* (2013.01); *B01D 2253/104* (2013.01); *B01D 2253/106* (2013.01); *B01D 2253/308* (2013.01)

(58) Field of Classification Search
CPC ........ B01D 2253/104; B01D 2253/106; B01D 2253/308; B01D 53/0415; B01D 53/261
See application file for complete search history.

(56) References Cited

U.S. PATENT DOCUMENTS

| 5,930,910 | A | 8/1999 | Trapp et al. |
| 6,139,609 | A | 10/2000 | Eimer et al. |
| 7,264,660 | B2 | 9/2007 | Kelly et al. |
| 7,320,725 | B2 | 1/2008 | Arno et al. |

*Primary Examiner* — Christopher P Jones
(74) *Attorney, Agent, or Firm* — Kilpatrick Townsend & Stockton LLP

(57) ABSTRACT

A cartridge-based gas drying device for external electrical boxes. The device attaches to the box via box connector fitted through an existing knock-out in a wall of the box. The device includes an indicating molecular sieve filled with hydroscopic desiccant that absorbs water vapor in the box to maintain the humidity below ambient outside humidity levels. A two-piece design allows the device to be serviced without requiring subsequent access to the inside of the electrical box.

11 Claims, 3 Drawing Sheets

US 10,363,520 B2

DRYING CARTRIDGE FOR OUTDOOR ELECTRICAL COMPONENTS

FIELD OF THE INVENTION

The invention relates generally to moisture regulation and more particular to moisture regulating devices for outdoor electrical components such as breaker boxes, sub-panels, shut-off devices and other such devices.

BACKGROUND OF THE DISCLOSURE

Outdoor electrical boxes such as load centers, combiner boxes, junction boxes, main electrical panels, sub-panels, breaker boxes, and even active devices such as inverters, rapid shutdown devices, and power storage devices, etc., must remain operational in a variety of climates and conditions. In some areas, the temperature may swing from 100 degrees Fahrenheit in summer to sustained sub-zero temperature in winters. In others, prolonged periods of rain may last for weeks or even months. Most often, these boxes remain in service for decades and are neither insulated nor water proof, although some may have a gasket or other seal to at least prevent the ingress of liquid water. However, because they are not in a climate controlled environment—typically such boxes are installed on an external wall of the building adjacent to an electrical meter—condensation and water vapor from humidity will often find its way inside. This moisture can accelerate the degradation of components and connections contained inside. Exacerbating this problem is the fact that occupants rarely, if ever, try to access these boxes unless there is a non-working circuit or a need to disable service during repairs. As a result, these boxes may go years at a time without ever being opened. In some cases, depending on whether the occupant or service provider owns the box, it may not even be possible to open them without assistance from the service provider.

As a result, there exists a need for a device that will prolong the life of electrical connections and components contained in outdoor electrical component boxes without requiring ongoing internal access.

SUMMARY OF THE INVENTION

Various embodiments of the invention ameliorate the above noted problems by providing a detachable cartridge for use with outdoor electrical boxes that removes water vapor from the in-box atmosphere to maintain the humidity inside the box at lower levels than the ambient atmosphere. Various embodiments provide for a device that includes a disposable cartridge that may be periodically replaced without requiring internal access to the box. Various embodiments provide for a device with a visual indicator that provides a visible indication of the degree to which the cartridge has been saturated with water. Various embodiments provide a cartridge that contains a molecular sieve filled with an indicating desiccant. In various embodiments this cartridge may be removed when fully saturated and replaced with a new one through relatively simple means and without the assistance of a licensed electrician or service provider. These and other embodiments will become more evident in light of the attached drawing figures and corresponding detailed description.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving a drying cartridge for use with external electrical component boxes. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As noted herein, electrical boxes housing breakers, switches, and other circuits are located out of doors and may remain on the outside of a structure and expected to continue to perform for decades. During this time, the devices inside will be subjected to many thousands of heating and cooling cycles as well as many different levels of atmospheric humidity. The nature of the closed box will provide some degree of protection, at least from falling and wind-blown precipitation, and should provide some resistance to swings in humidity and temperature but may not protect internal components from surface rust and oxidation resulting from exposure to oxygen and water vapor. Over time, this decay may result in accelerated failure of internal components.

In some cases it is possible to open these boxes periodically to inspect the internals, however, this is not without risk. For one, opening the box allows environmental contaminants to enter. Two, opening the box may expose conductive connections that pose a shock, arcing and even electrocution hazard. Three, the nature of these devices is such that for the most part, they are not designed to have a consumer interface. Once installed, occupants rarely, if ever, think about them until something stops working or until service must be temporarily shut off for a repair other service operation.

In other cases, where the box is actually owned or controlled by a service provider, such as a utility, inspection of the box internals is not possible without the help of a technician with a special tool or key and who is authorized to open the box.

In order to ameliorate at least some of these problems, the inventor has developed a replaceable drying cartridge with an externally visible molecular indicating sieve that will allow an observer to determine when the desiccant material has become saturated and permit replacement without requiring access to the inside of the box.

Figure 1:
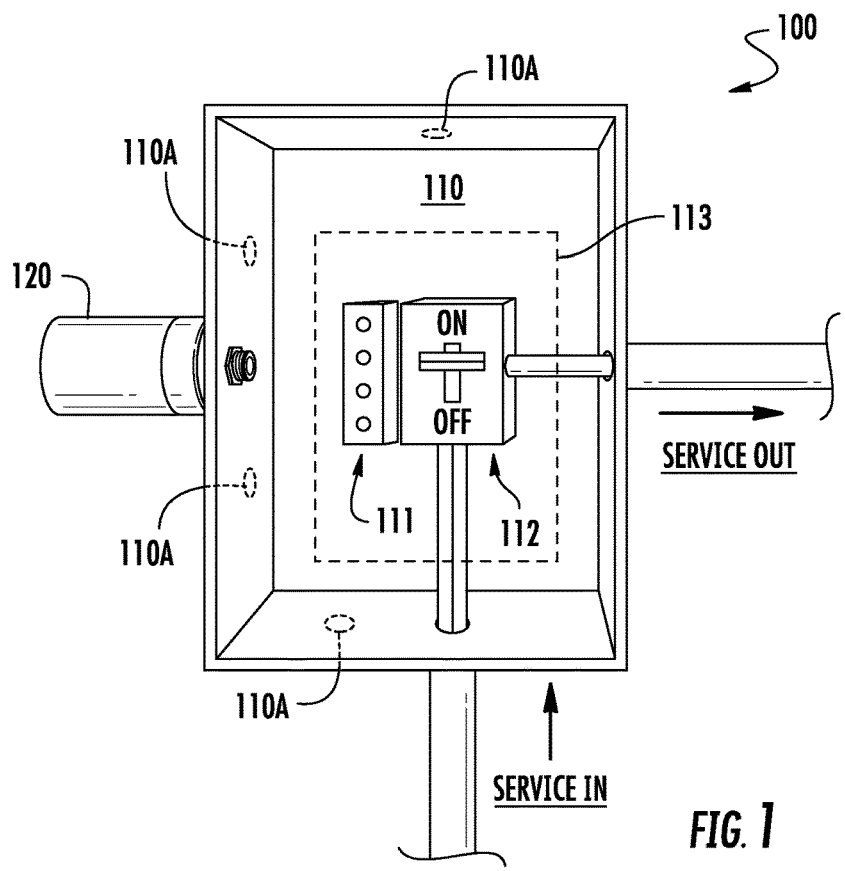
FIG. 1 is a pictorial drawing of an external electrical service panel including a drying cartridge according to various embodiments of the invention.

Turning now to the drawings wherein like reference numerals indicate substantially like elements in all of the several views, FIG. 1 is a pictorial view of a conventional outdoor electrical box 100. Box 100 is a standard four-sided, wall-mounted box with back 110 and a front (removed for ease of illustration). The box has electrical service entering and exiting at the points indicated as "service in" and "service out" respectively. Inside box 110, wire terminals 111 and breaker 112 are visible, and although not shown, it is common to have exposed and/or visible bus bars, conductive wires and other potentially dangerous, exposed current-carrying components. In typical electrical installations, current-carrying components are isolated away from the outer edges of the box to prevent arcing, such as in middle region 113 shown in FIG. 1. Also, as is known in the art, if box 100 is metal, it may include plurality of knockouts 110A around its perimeter to accommodate service in, service out, and any other external connections at multiple different locations for maximum flexibility in installation. These structures mark points where a hole may be made in box by tapping with a hammer or punch to detach the pre-cut metal discs making up the knockout. Plastic boxes may also have knockouts pre-cut into them, or alternatively, a drill may be used to create a passage at the desired location.

FIG. 1 also shows drying device 120, depicted as a canister attached to an outside wall of box 100 via one of the available knockouts. Typically such knockouts are dimensioned to receive a ½" diameter connector and retaining nut, although some boxes may include knockouts of two or more different dimensions. Those skilled in the art will appreciate that the service in, service out, and drying device 120 may be located at any of the available knockout locations or even at a custom drilled location as necessary to suit the needs of a particular installation. Also, in real-world installations, a partially or fully hinged door would cover box 100, and depending on the nature of the components contained within, a gasket may also be placed around the perimeter of box 100 between the box and the door, or adhered to the underside of the door, and there may be a latch or even a lock keeping the door closed.

Figure 2:
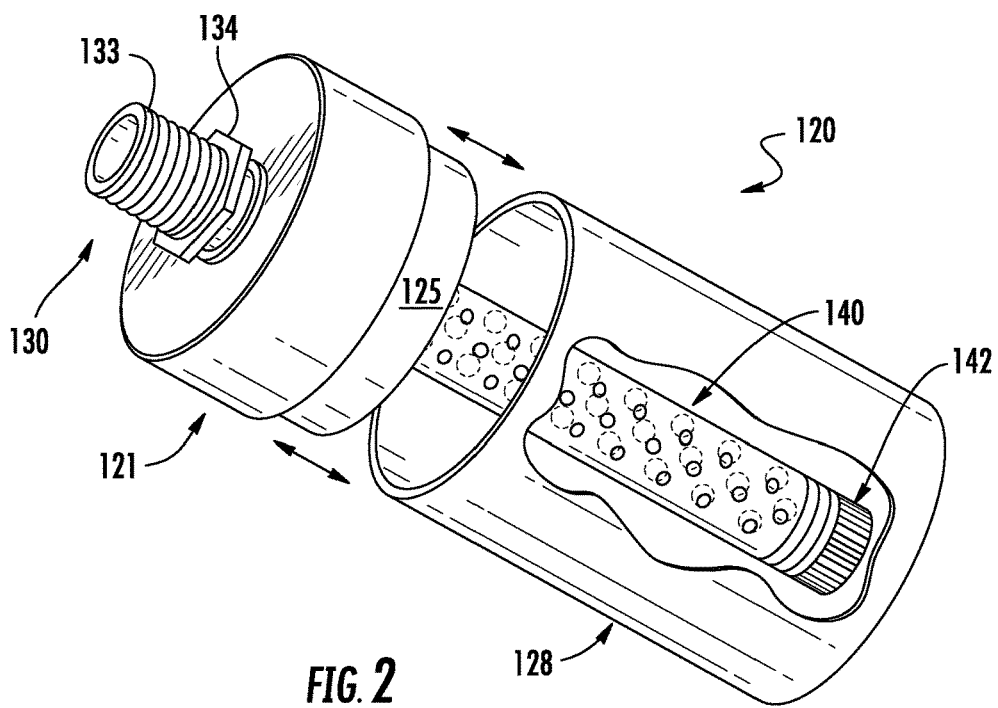
FIG. 2 is a partial cutaway isometric view of a drying cartridge according to various embodiments of the invention.

Referring now to FIG. 2, this figure is a partial cutaway isometric view of a drying cartridge according to various embodiments of the invention. In the Figure, device 120 is depicted as a two-piece housing, consisting of fixed portion 121 and detachable portion 128. Threaded portion 133 of coupler 130 and retaining nut 134 protrudes through the distal end of fixed portion 121. In various embodiments, coupler 130 will provide a passage for air to flow and be exchanged between the inside of box 100 and drying device 120. In various embodiments fixed portion 121 will include threads in its opening so that it can be detachably mated with coupler 130. In other embodiments fixed portion 121 may be permanently bonded to coupler 130 by welding or using another known attachment technique.

In various embodiments, fixed portion 121 may include tapered portion 125 having a slightly narrower diameter that is dimensioned to receive the fixed diameter detachable portion 128 and to secure it with a friction fit. Those skilled in the art will appreciate that tapered portion 125 may have threads, protrusions or other mechanical features designed to secure detachable portion to fixed portion 121 with a stronger fit than can be provided with a friction alone.

Also visible in FIG. 2 is tubular molecular sieve cartridge 140, also referred to conventionally as a moisture trap. As shown, molecular sieve 140 consists of a generally tube-shaped body with a plurality of openings around its entire circumference allowing airflow to contact the volume of hydroscopic desiccant material contained within. In various embodiments, the tube-shaped body may be made of a non-corrosive material such as glass, plastic, copper, aluminum, or other such material. End cap 142 keeps the desiccant material trapped within the tube-shaped body. Though not shown in FIG. 2, the tubular body may terminate in a second end cap at the end closest to fixed portion 121. The partially exploded sectional view of FIG. 3 and sectional view of FIG. 4 provide greater detail of device 120's internal components and structure. As seen in the exemplary embodiment shown in these Figures, molecular sieve cartridge 140 comprises a section of tubular material with first threaded end portion 141 to engage with end cap 142. It should be appreciated that glue or friction may be used to attach end cap 142 to sieve 140 instead of threads.

Figure 3:
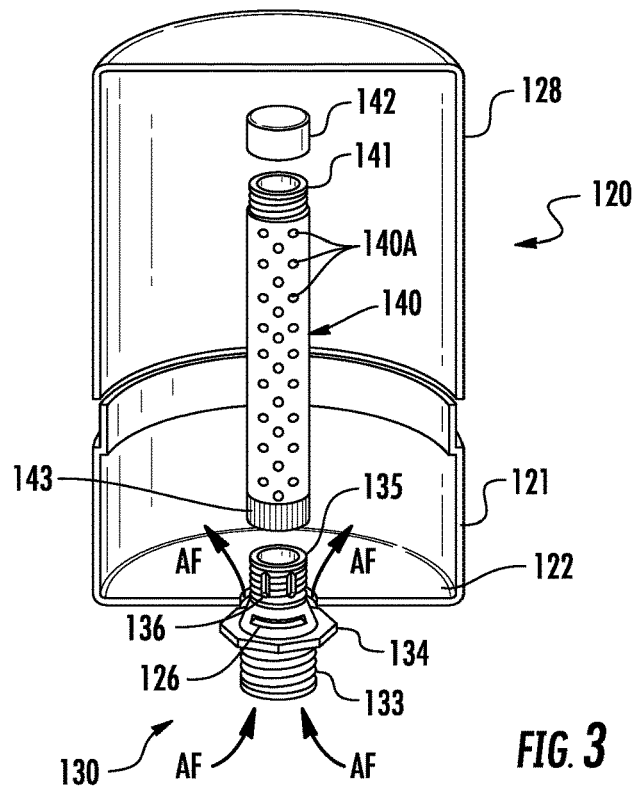
FIG. 3 is an exploded sectional view of an uninstalled drying cartridge according to various embodiments of the invention.
Figure 4:
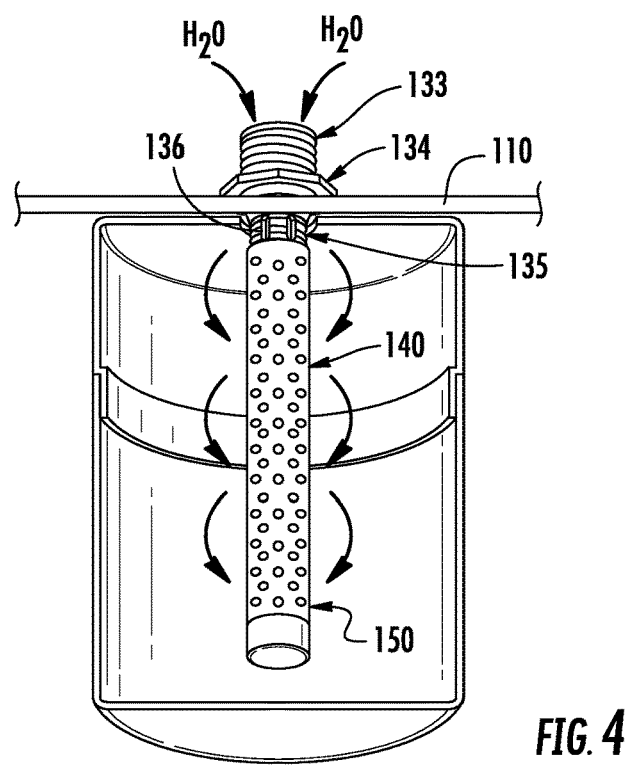
FIG. 4 is sectional view of an installed drying cartridge according to various embodiments of the invention.

With continued reference to the exemplary embodiment of FIGS. 3 and 4, as shown, coupler 130 includes first male threaded 133 portion that engages with restraining nut 134 to restrain fixed portion 121 against the sidewall of box 100. In various embodiments coupler 130 may also include second threaded portion 135 for attaching to fixed portion 121 of device 120 as well as to sieve 140. In such embodiments, opening 122 in fixed portion 121 may also be threaded so that it can easily mate with coupler 130. Though not shown, a gasket may be provided between fixed portion 121 and box sidewall 110 to create a more airtight seal. Also, coupler 130 may have a plurality of air vents 136 cut into threaded portion 135 to allow circulation of air between box 100 and the inside of drying device 120 via coupler 130. Once attached, air is able to flow between box 100 and device 120 via coupler 130 as indicated by the arrows in FIGS. 2 and 3. Once inside, it will circulate around sieve 140, with openings 140A allowing the relatively moist air to reach the volume of desiccant material contained inside where it will be trapped.

In various embodiments, at least a portion of, if not the entirety of sieve 140 as well as detachable portion 128, may be transparent so that the desiccant material contained inside is visible from the outside, without separating detachable portion 128 from fixed portion 121, or otherwise disassembling the device. Alternatively, detachable portion 128 may have a small transparent window built into its body that allows viewing of the molecular sieve cartridge to observe the color of the desiccant contained within. In this way, the current saturation level of the device can be visually confirmed by simply observing the color of the desiccant. If the desiccant material 150 is fully saturated, as indicated by a color change away from the original blue color of the material towards beige, the sieve can be removed and exchanged for a new one without having to remove fixed portion 121 and without having to gain access to the inside of box 100. This will improve safety, as untrained persons won't be tempted to open box 100 to check its condition, exposing themselves to the possibility of electric shock.

Figure 5:
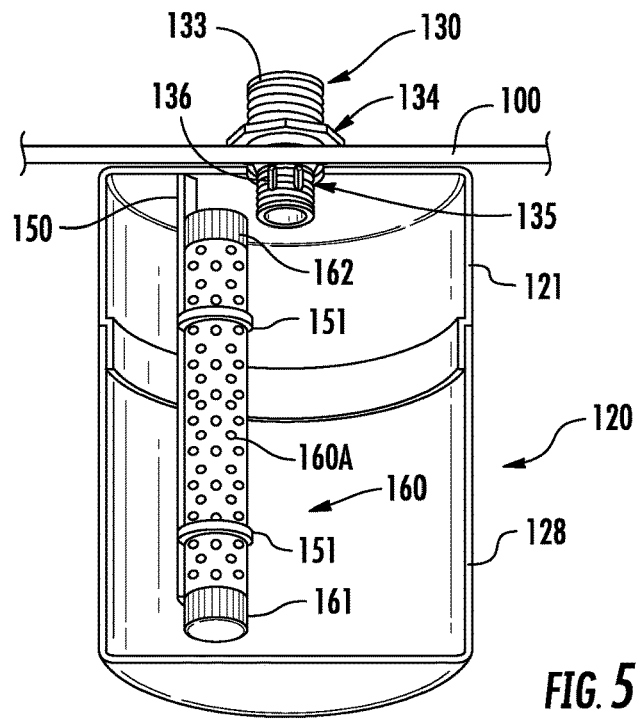
FIG. 5 is a sectional view of an installed drying cartridge according to various other embodiments of the invention.

Referring now to FIG. 5, this figure is a sectional view of a drying device for outdoor electronic boxes according to another exemplary embodiment of the invention. In this embodiment, as with the embodiment shown in FIGS. 2-4, coupler 130 is used to join fixed portion 121 to the wall of box 100 with retaining nut 134 via a knockout in the wall of the box. However, unlike the embodiment of FIGS. 2-4, molecular sieve 160 is held within device 120 by attachment to mounting bracket 150, shown in the figure as a rod welded or otherwise attached to the inside of fixed portion 121. In various embodiments, fasteners 151 are used to secure sieve 160 to mounting bracket 150. Fasteners 151 may be clamps, ties, bands or other suitable fasteners. In this way, a standard coupling can be used without having to form additional airflow holes because air can flow freely from inside box 100 to the inside of device 120 where the hydroscopic desiccant in sieve 160 will trap any moisture; replacement of sieve cartridge 160 may be accomplished by cutting or otherwise removing fasteners 151 and attaching a new one with unsaturated desiccant.

Figure 6:
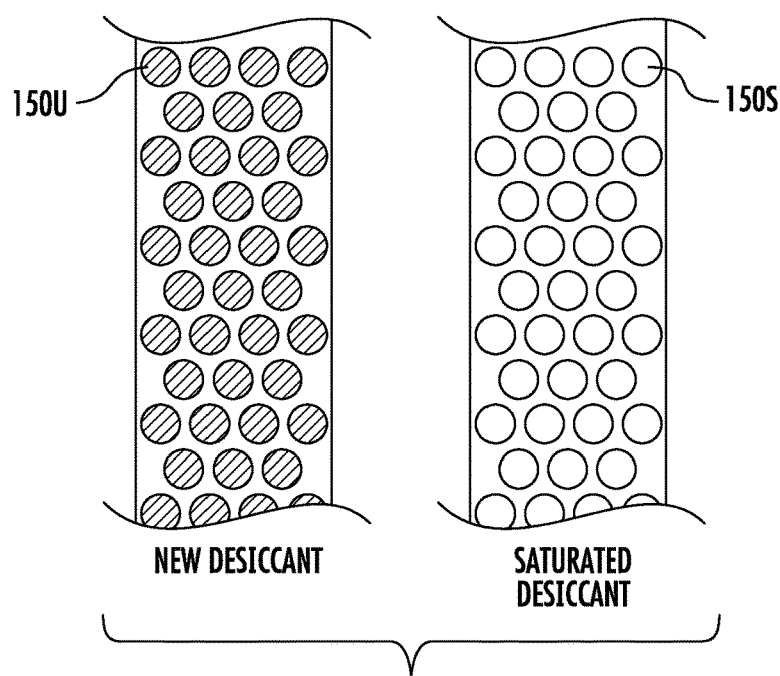
FIG. 6 shows two views of new and saturated desiccant in a drying cartridge according to various embodiments of the invention.

FIG. 6 shows two different views of a portion of sieve cartridge 140 with desiccant beads shown in a new unsaturated condition 150U and fully saturated 150S, after it has absorbed water vapor from box 100. In various embodiments, desiccant 150 is an aluminosilicate such as sodium alumina silicate (chemical formula: Na[(AlO)(SiO)]) that has been impregnated with an inorganic metal salt moisture indicator such as cobalt chloride (chemical formula: $CoCl_2$). One such suitable product is DelSORB® 4A48BIMS Blue Indicating Molecular Sieve desiccant sold by the Delta Absorbents division of Delta Enterprises, Inc. of Roselle, Ill.

Aluminosilicate has a crystal structure with a network of pores of uniform diameter, which in various embodiments, will be in the range of 3 to 6 angstroms and preferably about 4 angstroms. Because of the small pore size, only water and other equivalently small molecules can pass into the sieve. Water molecules are very small and an approximate diameter of less than 3 angstroms. In various embodiments, to reload device 120, an operator merely has to remove the molecular sieve cartridge by removing detachable portion 128 and unscrewing sieve cartridge 140 from the coupler or detaching sieve cartridge 160 from the mounting bracket and replacing either with a new, unsaturated one. A useful property of aluminosilicate desiccants is that their saturation is reversible. Simply heating them to 300-320 degrees Celsius will reactivate them by removing the water vapor from the sieve matrix and returning the desiccant to its unsaturated state and color.

The inventor of this invention has experimented with two identical plastic junction boxes (control and test) having a Lexan window formed in one outer face with a drying device according to the various embodiments of the invention attached to one. The boxes were subject to identical atmospheric conditions before closing and an AA battery, temperature gauge and humidity gauge were placed in each. Observations were made over a test period of 20 days during which time temperature and humidity readings were recorded periodically. This testing showed that the drying device according to the various embodiments of the invention significantly reduced humidity through a range of temperatures. A film of condensate matter was visible on the Lexan window of the control box but the test box window was clear. Moreover, the battery placed in the control box experienced observable oxidation and surface rusting in only twenty days whereas the battery in the text box was free of rust, corrosion or oxidation.

Accordingly, a drying device for outdoor electrical boxes has been disclosed that relies on a replacement sieve cartridge for effectively reducing the humidity within an outdoor electrical enclosure without requiring repeated access to the inside of the box or handling of messy saturated or unsaturated desiccant material.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A gas drying device comprising
a two-piece housing comprising a fixed portion and a detachable portion;
a threaded male connector built into the fixed portion, the threaded male connector having a female restraining nut operable to restrain the fixed portion against the wall of an electric box when the threaded mail connector is inserted into a knockout formed in a wall of the box;
a gasket positioned between the restraining nut and the wall of the box;
a molecular sieve contained within the two-piece housing so that openings in the sieve are open to the ambient atmosphere within the two-piece housing when the housing is closed; and
a volume of desiccant contained within the molecular sieve, wherein at least a portion of the detachable portion comprises a window allowing viewing of the molecular sieve without detaching it from the fixed portion.

2. The device according to claim 1, wherein the molecular sieve comprises a substantially tube-like structure with a plurality of through holes formed around a perimeter thereof.

3. The device according to claim 2, wherein each of the through-holes has a diameter in a range of 1/32 to 1/10 of an inch.

4. The device according to claim 3, wherein the desiccant material comprises desiccant beads having a diameter in a range of 1/4 to 1/10 of an inch.

5. The device according to claim 4, wherein a diameter of the desiccant material is larger than a diameter of each of the through-holes.

6. The device according to claim 1, wherein at least a portion of the molecular sieve comprises an indicating molecular sieve.

7. The device according to claim 6, wherein desiccant material is a material that when unsaturated is blue in color but that changes color away from blue as the desiccant reaches saturation.

8. The device according to claim 7, wherein the desiccant material comprises sodium alumina silicate impregnated with an inorganic salt moisture indicator.

9. The device according to claim 8, wherein the desiccant material has a nominal pore opening in a range of 3 to 6 angstroms.

10. The device according to claim 1, wherein the threaded male connector comprises a ½ inch punch-out box connector.

11. The device according to claim 1, wherein the detachable portion comprises a transparent material.

* * * * *